UNITED STATES PATENT OFFICE.

JOHN H. SMITH, OF MADISON RUN STATION, VIRGINIA, ASSIGNOR OF ONE-HALF HIS RIGHT TO THOS. W. BOND AND JOS. M. HENDERSON, OF SAME PLACE.

IMPROVEMENT IN PROCESS OF WELDING STEEL TO CAST-IRON.

Specification forming part of Letters Patent No. 140,087, dated June 17, 1873; application filed May 21, 1873.

*To all whom it may concern:*

Be it known that I, JOHN H. SMITH, of Madison Run Station, in the county of Orange and State of Virginia, have invented a Process for Welding Steel to Cast-Iron, of which the following is a specification:

The object of my invention or discovery is to weld steel to cast-iron.

In the application of my invention, I first form the steel so that it will correspond to the surface of the cast-iron to which it is to be welded without forming a lap. I then heat the parts to be welded to a cherry-heat, and apply borax to the surfaces to be united, and immediately heat the parts to a "borax" or welding heat, and bring them together with a strong pressure without hammering.

This process is applicable whenever it is desired to weld steel to cast-iron—as, for example, pointing cast-iron plow-shares with steel.

What I claim as my invention, and desire to secure by Letters Patent, is—

The process of welding steel to cast-iron, substantially as described.

JOHN H. SMITH.

Witnesses:
 THOS. W. BOND,
 JOSEPH M. HENDERSON.